United States Patent
Shaar

[19]

[11] Patent Number: 5,979,363
[45] Date of Patent: Nov. 9, 1999

[54] AQUACULTURE FARMING SYSTEM

[75] Inventor: C. M. Shaar, Santa Barbara, Calif.

[73] Assignee: Gulf Gas Marine Limited

[21] Appl. No.: 08/433,658

[22] Filed: May 4, 1995

[51] Int. Cl.$^6$ .................................................. A01K 63/00
[52] U.S. Cl. ............................................................. 119/230
[58] Field of Search .................................... 119/215, 230, 119/233, 207, 209, 210, 212

[56] References Cited

U.S. PATENT DOCUMENTS

| | | | |
|---|---|---|---|
| 3,293,861 | 12/1966 | Hinde | 61/1 |
| 3,320,928 | 5/1967 | Smith | 119/3 |
| 3,477,406 | 11/1969 | Fujinaga | 119/2 |
| 3,626,901 | 12/1971 | Englesson | 119/3 |
| 3,709,195 | 1/1973 | Tabb | 119/208 |
| 3,717,124 | 2/1973 | Jacobs | 119/223 |
| 3,841,999 | 10/1974 | Bennett et al. | 210/17 |
| 3,998,186 | 12/1976 | Hodges et al. | 119/2 |
| 4,003,338 | 1/1977 | Neff et al. | 119/223 |
| 4,019,459 | 4/1977 | Neff | 119/223 |
| 4,079,698 | 3/1978 | Neff et al. | 119/223 |
| 4,271,099 | 6/1981 | Kukla | 261/76 |
| 4,271,788 | 6/1981 | Knowles | 119/233 |
| 4,351,269 | 9/1982 | Rines et al. | 119/3 |
| 4,354,457 | 10/1982 | Knowles et al. | 119/3 |
| 4,365,938 | 12/1982 | Warinner | 417/54 |
| 4,488,508 | 12/1984 | Heideman | 119/3 |
| 4,509,459 | 4/1985 | Knowles et al. | 119/3 |
| 4,803,949 | 2/1989 | Kiyokawa | 119/233 |
| 4,972,801 | 11/1990 | Hunt | 119/3 |
| 5,178,093 | 1/1993 | Reese et al. | 119/3 |
| 5,216,976 | 6/1993 | Marinkovich | 119/215 X |
| 5,322,035 | 6/1994 | Hawes et al. | 119/3 |

FOREIGN PATENT DOCUMENTS

| | | | |
|---|---|---|---|
| 1489032 | 7/1967 | France . | |
| 06-153739 | 6/1994 | Japan . | |
| 2023381 | 1/1980 | United Kingdom . | |
| 2114861 | 9/1983 | United Kingdom | 119/233 |

OTHER PUBLICATIONS

Frobish, "Water Quality Management and Aeration in Shrimp Farming," Fisheries and Allied Aquacultures Departmental Series No. 2, Alabama Agricultural Experiment Station, Auburn University, pp. 1–84, Feb. 1989.

*Primary Examiner*—Thomas Price
*Attorney, Agent, or Firm*—Arnold, White & Durkee

[57] ABSTRACT

An aquaculture system is disclosed in which feeding and aeration are provided by a bottom mounted piping system. In addition, floating surface panels may provide thermal insulation. The bottom mounted piping system allows a food and oxygen slurry to be injected into a pond even when the floating surface panels cover the pond. The floating surface panels may allow an air bubble to form between the pond surface and the panel to aid in thermal insulation. The aquaculture system is particularly adapted for use as a shrimp farm system.

39 Claims, 3 Drawing Sheets

AQUACULTURE FARMING SYSTEM

BACKGROUND OF THE INVENTION

Shrimp and certain fish species such as Redfish require warm water in order to live and grow. This has limited the growth of such species to the warmer months, typically when the water temperature does not go below about 68° F. One attempt to expand the growing season has involved the construction of a greenhouse roof over a pond to capture solar heat. However, it was found that such a roof would not withstand strong storms and did not provide the necessary reliability and efficiency. The use of a greenhouse type system presumably was tried because it allows typical shrimp farm feeding and aeration approaches to be utilized. These approaches involve feeding by throwing tiny food pellets onto the surface of a pond, and aerating the pond by a paddle wheel device that floats on the surface and vigorously splashes the water. These feeding and aeration methods however, are inefficient and are thought to actually reduce the potential yield. There is accordingly a continuing need for shrimp and warm water fish farming methods and aquaculture systems which can provide a longer growing season and more efficient feeding and aeration methods.

SUMMARY OF THE INVENTION

The present invention addresses the above problems and other drawbacks inherent in the prior art by providing improved systems of feeding and aerating aquaculture ponds. The systems not only increase the growing season by providing a thermally protected environment, but also deliver feed and aeration in a more efficient manner and in a manner consistent with the feeding habits of the species. The present invention pertains to a system for growing species of sea life which feed along the bottom of bodies of water. The invention has particular application to such species, especially shrimp, which require warm water to thrive effectively.

In one broad aspect, the invention comprises a system for growing shrimp and other bottom feeding species in a shallow, enclosed body of water and an underwater distribution system for supplying food throughout the reservoir and proximate the bottom of the reservoir. The enclosed body of water may be a small pond, from a few hundred to a few thousand gallons in volume, even up to a size of a few acres, preferably at an average depth of 3–5 feet. The distribution system in one preferred embodiment comprises a plurality of conduits arranged in a pattern which spans the reservoir. An example of such a pattern comprises a plurality of generally parallel, laterally spaced tubes or lengths of pipe connected at one end to a common header or manifold. Each such tube may be perforated along its length to discharge water and food into the reservoir. The food is preferably in the form of pellets or other particulates in a water slurry. Suitable nozzles or the like may be connected to the perforations to aid in obtaining a relatively evenly spaced distribution of feed throughout a reservoir. A pump, preferably a centrifugal pump, is employed to force an aqueous slurry of food through the conduit system.

The system of the invention may also include a heater for warming the water in a reservoir to a temperature conducive to growth. In the case of shrimp, for example, it is desirable that water temperature, especially for shrimp in the post larval stage, be at least about 68° F. Maintaining such a temperature not only promotes growth but also extends the growing season in cold regions where temperatures drop to levels below 68° F.

The system of the invention may also include the use of blankets or other covers to provide a thermal and evaporative barrier to the body of water. A preferred form of cover comprises one or more floatable frames which cover at least a portion of the surface of a reservoir and supports a flexible, water impermeable sheet or other suitable member over the surface.

In one preferred form, a reservoir cover comprises a plurality of buoyant, rectangular frames which are arranged in rows and columns to cover the surface of the water and shield it from the cool air above. The frames may support simple plastic sheeting or plastic sheeting containing bubbles or other thermal insulating features.

In a preferred form, the invention includes a system for supplying an oxygen-containing gas along with food into a reservoir. The gas may be supplied through a conduit system separate from the food system, but it is preferably supplied directly with the food. Thus, a source of air under pressure may be employed to force air into the water distribution system. The air or other oxygen containing gas rises within the reservoir and is trapped in part below plastic covered frame, thus inflating the plastic and forming an insulating layer between the plastic and the surface of the water. Excess gas may escape simply through spaces defined between the plastic covered frames. In a particularly preferred embodiment, the discharge conduits are spaced such that a conduit nozzle or opening is under approximately the center of each floating frame of the thermal cover.

The system of the invention may be installed in enclosed structures, but it is a particular advantage of the invention that it may be employed in natural or artificial ponds exposed to the elements. To deal with high winds, cables or other suitable restraining members may be installed above the reservoir covers to keep them in place. To deal with rain or the like, the covers may be provided with drains to convey water from the top surface of the covers to the reservoir underlying the covers. In a particularly preferred embodiment, the drains convey water to beneath the reservoir surface, to drain the top of the cover without disturbing the trapped air bubble.

The present invention in one broad aspect, provides an outdoor aquaculture system which is able to deliver feed and aeration to a pond from beneath the surface of the pond at various depths. The term "pond" for the purposes of this description may be considered to include not only natural or man-made outdoor ponds, but also tanks constructed of metal, plastic, concrete and the like. In any case, the system delivers and distributes feed and aeration more efficiently than prior methods and does not require access to the surface of a pond from above. Moreover, the invention may thereby further provide a system of thermal insulation that floats on the surface of the outdoor pond and allows the growing of shrimp or fish during periods when the outdoor ambient temperature is too low to support such growth. The invention, in that regard, has particular application in growing shrimp, which characteristically stay near the bottom of ponds.

The system of the invention provides at least three important advantages over prior aquaculture systems. First, highly aerated water is added throughout a pond for more efficient oxygenation; second, feeding is uniform and more efficient than simply throwing pellets on the water surface; and third, the surface of the pond can be covered with a thermal blanket, because no access to the pond surface from above is necessary for feeding or aeration. The use of a thermal blanket extends the typical outdoor pond growing season, because typical climates in which shrimp are grown have a season in which the outdoor ambient temperature drives the water temperature to a level too low to support shrimp. Because the thermal blanket is floating on the surface of a pond, it may be protected from high winds by being held to the surface by taut cables stretched across the upper surface of the blanket.

DETAILED DESCRIPTION OF THE PREFERRED EMBODIMENTS

The present invention in one preferred embodiment comprises an outdoor aquaculture system which employs a conduit feeding system to deliver feed and aeration from beneath the surface of an outdoor pond. The submerged conduit system delivers and distributes feed and aeration efficiently to specified depths, and may be combined with a system of thermal insulation that floats on the surface of the pond.

The feeding system in one preferred embodiment comprises a network of piping, preferably a light weight plastic such as polyvinyl chloride (PVC), laid on the bottom of the aquaculture pond. At a number of locations, riser pipes extend upward from the network toward the surface and terminate at the desired feeding depth or depths. A pump injects water into the system at a desired flow rate. Pelletized food is also injected into the water to form a mixture or slurry which flows through the piping system and is injected into the pond at various selected feeding locations. The feed slurry may conveniently be prepared and kept in a container connected to the piping system. Feed from the container may be injected immediately after the pump or at various locations in the feeding system. Feed distribution at each riser location may be accomplished with a simple open pipe or a nozzle. These same pipes may also be used for the uniform injection of water for thermal control and oxygen for the control of the dissolved oxygen level or for other purposes.

Figure 1A:
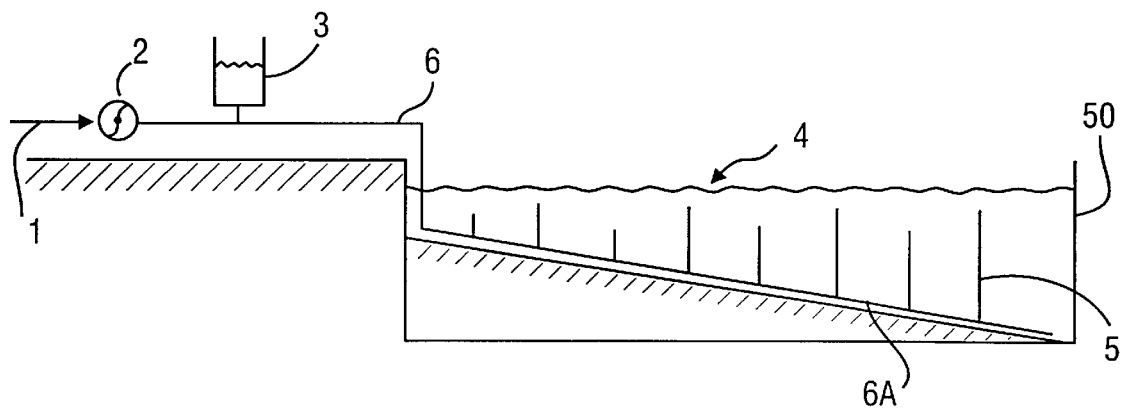
FIG. 1A is a side view of a pond aquaculture feeding system of the invention.
Figure 1B:
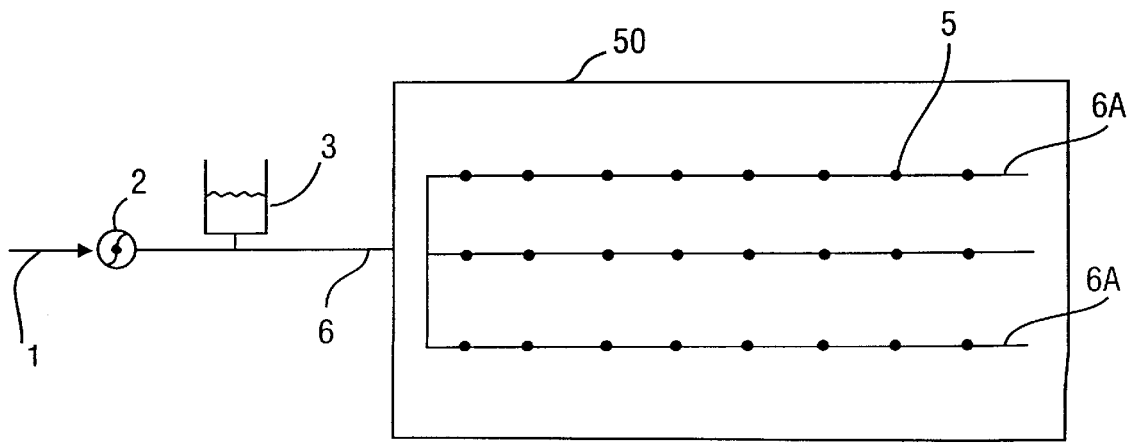
FIG. 1B is a top view of the system of FIG. 1A.

A schematic illustration in vertical cross-section of an exemplary aquaculture system is shown in FIG. 1A, and a top view is shown in FIG. 1B. For the purposes of the present description, the system will be considered to be directed to growing shrimp. The pond 50 shown in FIG. 1A and FIG. 1B will also be considered to be an outdoor pond. A pump system 2 such as a centrifugal pump is connected to a water source inlet 1. Water is pumped into a pipe 6 that is connected to a network of bottom mounted piping 6A. The network in this instance comprises a plurality of pipe lengths which are parallel and extend across the pond 50. Each pipe length includes a series of vertical outlet pipes 5 that may be terminated in a simple open pipe or a spray nozzle, for example. The height of the outlet pipes may vary according to the preferred feeding depth to be used, and may in certain embodiments reach the water surface 4. In the case of shrimp, it is preferred that the feed be delivered within one foot of the bottom. Though the bottom of the pond 50 is shown as sloped, the bottom mounted piping 6A may also be mounted on a flat bottomed pond, or to conform with any pond bottom elevation.

A feed pellet container 3 is connected to the pipe 6 where feed mixed with water in a slurry is fed into the system by means of a venturi that is placed at any appropriate point along the inlet pipe 6. In addition, the water is preferably aerated or oxygenated by injecting air or other oxygen containing gas into the inlet of the pump system 2 and allowing absorption in the inlet pipe 6. Alternatively, the air or other gas may be injected at other points of the piping system.

The piping system in FIG. 1A, FIG. 1B, FIG. 2A, FIG. 2B and FIG. 2C may also be used to infuse warm water into the pond 50 by obtaining the inlet water from a holding pond that is warmed by solar energy or by any other means. The inlet water may also be warmed by means of a conventional water heater.

Since feed distribution occurs under the surface of the water, a thermal and evaporation control barrier may be placed on the surface of the water. A preferred embodiment of the invention is to use one or more floating surface panels to provide a thermal blanket for temperature and evaporation control. The panels are designed to provide a cover for essentially the entire surface of a pond. The preferred panels comprise a floating frame enclosing a sheet material that forms the insulating layer. The frames are designed to capture and hold an air bubble between the surface of the water and the sheet material and further to drain water from above the sheet material into the pond beneath the surface so as not to disturb the air bubble. The thermal blanket sheeting material may be transparent or translucent. In conditions where thermal insulation is not required, or when the shrimp or fish have been moved into a large production pond, the feeding and/or aeration system may be used without a cover on the water surface.

The dissolved oxygen level in the pond water may be increased by providing an inlet operable to inject air or other oxygen containing gas into the intake of a centrifugal pump used for water circulation. This may be done without losing intake suction by pressurizing the intake of the circulating pump with a second pump. Air injected into the centrifugal circulating pump is beaten into many tiny bubbles thus greatly increasing the absorption surface area. In addition, a long run of pipe is provided on the output side of the pump to keep the air and water in contact, under pressure, long enough for substantial absorption of the gas to be completed.

When large populations of algae are growing in a pond, they sometimes consume more of the dissolved oxygen than can be replaced easily by injecting air alone into the centrifugal pump inlet. In this case, pure oxygen may be added to the inlet air flow to increase the amount of dissolved oxygen in the water. Furthermore, algae may also impact the oxygen levels because algae produce oxygen during the day, but consume oxygen at night. Thus to encourage daytime oxygen production, it may be desirable to raise the thermal cover during warmer weather conditions, such as near the end of the pond growing period, in order to allow more light into the pond during the daytime. This may be desirable even if the cover is formed from a relatively transparent material.

For additional control of temperature, especially where it is necessary to warm the water going into an aquaculture pond, a conduit system of the invention may be connected to a warm water source, such as a holding pond adjacent to the growing pond, for example. In this case the holding pond may have its water surface covered with an opaque black plastic or similar material designed to absorb solar radiation. Feed water for the growing pond may then be pumped from the holding pond as required. If additional heat is required intermittently, it may be supplied from a gas fired heat exchanger, or any other appropriate heat source. Such a heat source, for example may comprise a conventional solar water heater system, and no holding pond would be required.

As mentioned above, an especially preferred thermal cover comprises a system of floating surface panels that provide a covering for the surface of an aquaculture pond to control temperature and water evaporation. A preferred surface panel comprises a floating frame, which may be constructed of PVC pipe. The panels may be of various sizes and shapes, with a rectangle or square being preferred shapes. The surface panel may also comprise a plastic material secured to the frame to cover the water surface.

The plastic material may be attached to the frame in such a way that it will retain an air bubble between the floating panel and the surface of the water. In this fashion the cover only touches the water where it is attached to the panel frame and over most of its surface provides a stagnant air barrier to evaporation and heat transfer.

The surface panels may also comprise one or more drains at one or more corners of the panel frame, and preferably at each corner. The drains are operable to drain water from the top of the panel to an outlet beneath the surface of the pond, thereby accomplishing drainage of rain water without disturbing the air bubble.

Figure 2A:
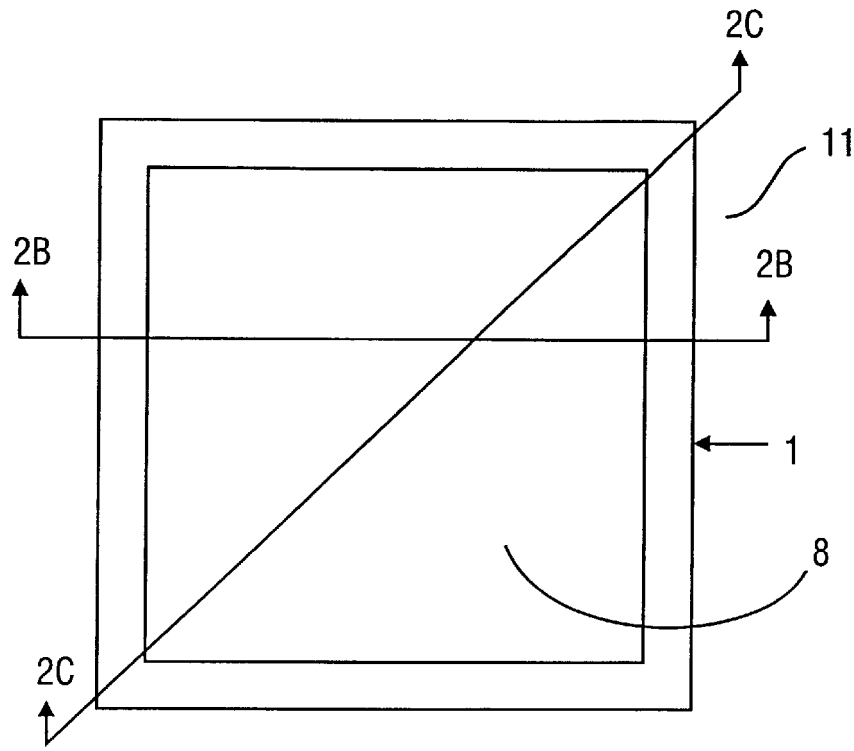
FIG. 2A is a top view of a surface panel.
Figure 2B:
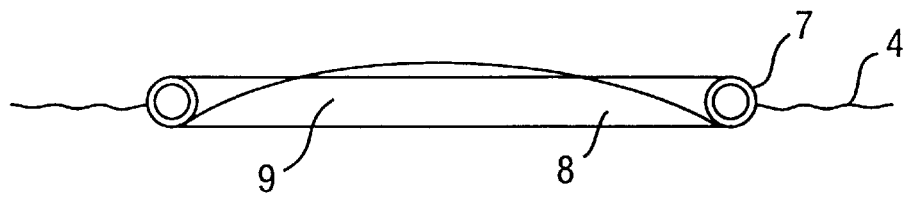
FIG. 2B is a cross section taken at A—A of the surface panel in FIG. 2A.
Figure 2C:
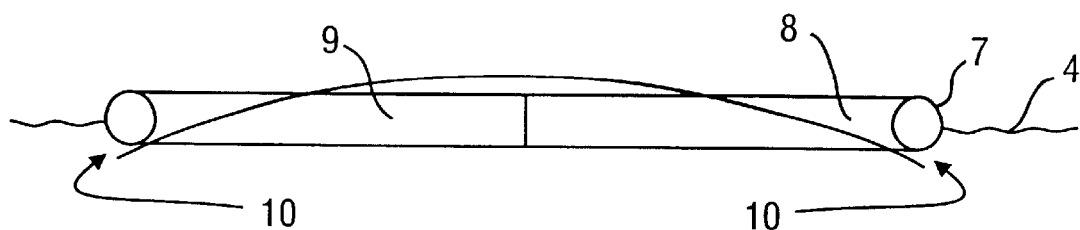
FIG. 2C is a cross section taken at B—B of the surface panel in FIG. 2A.

A panel system for providing thermal insulation to the pond is shown in FIG. 2A, FIG. 2B and FIG. 2C. A schematic of a single floating surface panel 11 is shown in top view in FIG. 2A. The surface 4 of an aquaculture pond 50 may be covered by a plurality of the panels 11. For example, for a surface of 24×80 feet, 30 panels of 8×8 feet in size may be used. The frame members 7 may be constructed of any buoyant or floatable material, with polyvinyl chloride (PVC) pipe being the most preferred. The figure shows a square surface panel, however, any shape may be used as appropriate for a given application. The interior of the frame is filled by a sheet of water impermeable material 8 such as polyethylene that forms a seal around the interior of the frame. When installed over a pond, the floating surface panels are placed contiguously to essentially cover the entire surface of the pond.

As shown in FIG. 2B, air from the inlet pipes, preferably positioned below each surface panel forms an air bubble 9 that is captured in the space between the surface of the water 4 and the water impermeable sheet 8. This provides a stagnant air barrier and increases the thermal insulation of the system. The sheeting material is preferably transparent or translucent.

FIG. 2C illustrates another important aspect of the invention in the form of drains 10 provided at one or more corners and preferably at each corner of the frame. These drains allow rain water to run off the sheeting material and to empty under the surface of the water, thereby leaving the air bubble intact. Each surface panel is preferably anchored by a taut cable secured at the sides of the pond and passing over the surface panels. This anchor helps to stabilize the panels in high winds.

Figure 3A:
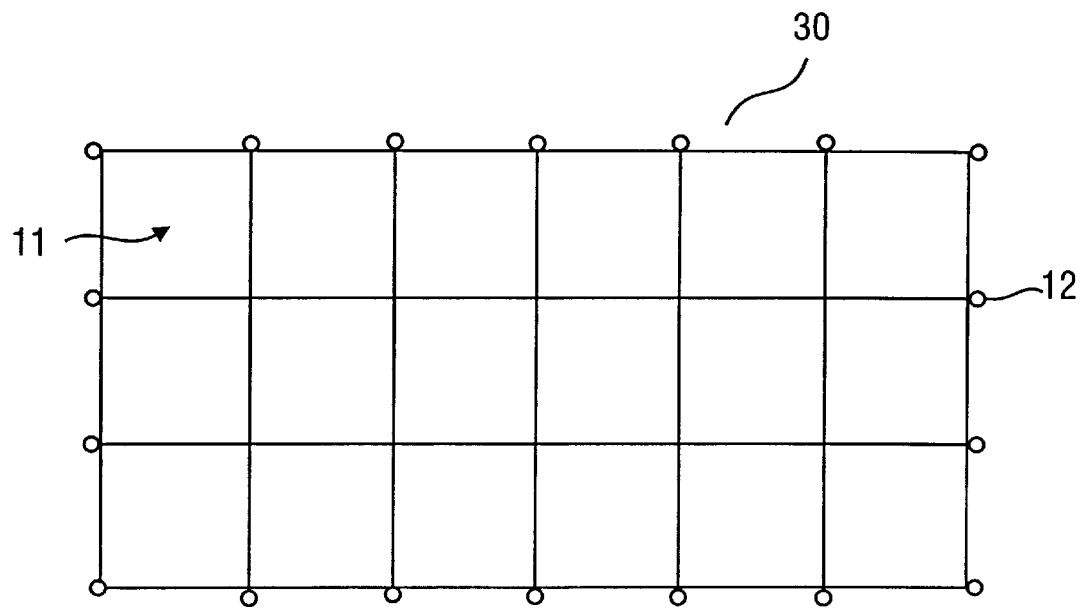
FIG. 3A is a schematic drawing of a stand-alone nursery pond.
Figure 3B:
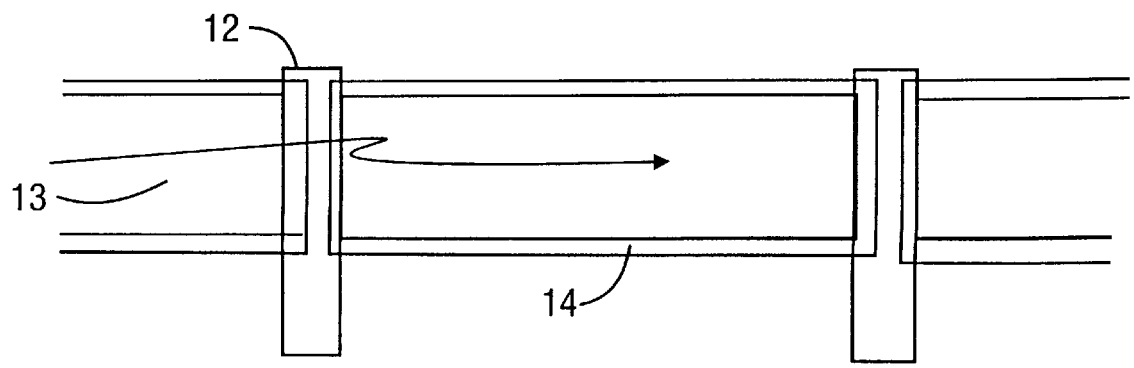
FIG. 3B is a side view elevation of the nursery pond in FIG. 3A.

Another preferred embodiment of the present invention comprises a stand alone nursery pond 30 as shown in FIG. 3A (top view) and FIG. 3B (side view). This nursery pond 30 may be constructed to provide a nursery for early growth of shrimp or other fish species prior to release into a large (acre size) growing pond, and is preferably constructed adjacent to or as a division of a larger pond. The nursery pond comprises posts 12, sides 13 and a bottom 14. Surface panels 11 are shown forming a contiguous cover for the nursery pond 30 in FIG. 3A.

Thus, an important aspect of the present invention may be described as a method of culturing shrimp or other species by providing one or more floating surface panels to effect a thermal and evaporative barrier to an aquaculture pond.

Another aspect of the present invention resides in a cover for an aquaculture pond. The cover comprises a frame composed of floatable frame members, and a water impermeable sheet attached along the interior of the frame members to form a seal and cover the internal opening formed by the frame members. The cover may further comprise one or more drains located near one or more corners of the surface panel, wherein each drain forms a conduit from above the water impermeable sheet to below the surface of a pond when the surface panel is floating on a pond.

Still another aspect of the invention concerns an aquaculture system comprising a nursery pond, which includes a piping system to deliver feed and aeration into the pond from beneath the surface of the pond. The nursery pond may further comprise thermally insulating floating surface panels. If desired, the nursery pond may be installed in a small section of a larger pond by using a plastic or other thermal barrier around the smaller pond which extends from the water surface to the bottom. This is easily accomplished since such ponds are normally about 3 to 4 feet deep.

Alternatively, one or more nursery ponds may be utilized as a separate pond or ponds placed adjacent the larger pond. Thus, the feeding, aeration and thermal protection features of the present invention may be utilized in smaller ponds adjacent to larger production ponds. In this context, the smaller, warm nursery ponds are used to start the growth of the shrimp or other species during early stages of development and/or growth when the larger production pond is too cold to support the shrimp or other species. Then, when the temperature of the larger pond increases due to seasonal warming, the shrimp or fish may be simply transferred from the smaller nursery ponds to the larger production pond.

The oxygenation and slurry feeding system used in the nursery pond may also be used in the large production ponds which are typically up to many acres in size. In this application, both oxygen and feed are injected near the bottom, where many species, especially shrimp, spend much of their time. In addition, both oxygen and feed are more evenly distributed throughout the production pond, thus increasing pond productivity.

The following examples are included to demonstrate preferred embodiments of the invention. It will be appreciated by those of skill in the art that the techniques disclosed in the examples which follow represent techniques discovered by the inventor to function well in the practice of the invention, and thus can be considered to constitute preferred modes for its practice. However, those of skill in the art, in light of the present disclosure, will appreciate that many changes can be made in the specific embodiments which are disclosed and still obtain a like or similar result without departing from the spirit and scope of the invention.

EXAMPLE 1

To raise shrimp in an aquaculture facility, the process starts in a hatchery where full grown shrimp are kept in small breeding tanks. When the female spawns, she releases about one million larvae. These larvae are transferred to another small tank where they are carefully fed a special diet until they have passed through all of their larval stages (typically a few weeks), and become tiny, post larval shrimp, ready for release into a nursery pond if the water temperature in the large production ponds is too low, or to a large production pond if the water temperature is typically 68° F. or more. For a five acre production pond with an average depth of four feet, or a nursery pond designed to service a five acre production pond, typically one million shrimp are introduced at the beginning of the growing season.

Once the post larval shrimp are in the nursery pond, the function of the surface panels of the present invention is to absorb solar energy during the day and to prevent evaporation and cooling of the pond at night. The oxygenation system must maintain the level of absorbed oxygen in the water at about 6 to 8 parts per million to provide optimum growing conditions for the shrimp throughout the water in the pond. The slurry feeding system distributes the necessary feed evenly across the bottom of the pond where the shrimp normally feed. As the shrimp grow, the amount of feed is increased, and toward the end of the growing period, when larger amounts of feed must be used, the algae population may dramatically increase and commence to seriously decrease absorbed oxygen levels unless the rate of oxygenation is also increased. To guard against this condition, the present invention provides for injection of oxygen instead of, or in addition to, air into the circulating centrifugal pumps.

When the shrimp are started in a nursery pond servicing a large production pond, they will typically be started six to eight weeks before they are released into the production pond. Once in the production pond, the growing period is typically six months to harvest.

A nursery pond of the invention is typically designed as shown in FIG. 1A, FIG. 1B, FIG. 2A, FIG. 2B, FIG. 2C, FIG. 3A and FIG. 3B. The typical production pond is about five acres with an average depth of about 4 feet, with the bottom formed from the natural soil. The bottom of such a pond usually has gradual slope to facilitate draining of the pond to harvest the shrimp. The feeding and oxygenation of the large, production ponds can be much more efficiently accomplished with a larger version of the oxygenation and feeding system described herein for the nursery pond. Such a system will increase productivity in the production pond as well as in the nursery pond.

To aid in maintaining the proper salinity, the water provided through inlet 1 may preferably be salt water. The salinity of the pond may also be controlled by regularly circulating water having a proper salt content into and out of the pond through additional inlet and drainage means (not shown). Thus, for example, a portion of the water in the pond may be fresh salt water provided daily through such additional inlet means while a portion of the pond water may be drained daily through such drainage means.

The inventor has constructed such a pond that measures 26½ feet by 105 feet with a depth of 3½ to 4 feet. Approximately one million post larval shrimp were grown in the pond for about 7 weeks. The nozzle height in the pond was typically 1 foot or less. The feeding and aeration system as described herein comprised a matrix of riser pipes spaced 8 feet 9 inches apart such that each riser was positioned beneath the center of a floating panel (one riser per panel). When this pond was used to grow the one million shrimp, a yield of 1,000 pounds was realized rather than the 600 pound yield that is normally obtained in a pond of this size without the feeding, aeration and thermal insulation of the pond of the present example.

Although the example described herein is directed to the production of shrimp, other applications of the present invention may include redfish or other fish species. The aquaculture system shown and described which includes a food and oxygen slurry feeding system and floating panels that create a thermal blanket may be used for growing a variety of fish, and especially fish that feed near the bottom. Thus, the present invention may be utilized in other applications in which an improved growing yield and extended outdoor growing season is desired.

While the compositions and methods of this invention have been described in terms of preferred embodiments, it will be apparent to those of skill in the art that variations may be applied to the compositions, or methods described herein without departing from the concept, spirit and scope of the invention. All such similar substitutes and modifications apparent to those skilled in the art are deemed to be within the spirit, scope and concept of the invention as defined by the appended claims.

What is claimed is:

1. An aquaculture system comprising a pond, an underwater distribution system adapted to deliver a slurry of feed and aerated water into the pond from beneath the surface of said pond, and a feed source in communication with said underwater distribution system.

2. The aquaculture system of claim 1, which further comprises a warm water source connected to said underwater distribution system.

3. The aquaculture system of claim 2, which further comprises a pump system having an inlet connected to said water source and an outlet connected to said underwater distribution system, and means operable to inject air or oxygen containing gas into said inlet of said pump system so as to aerate water passing through the pump system.

4. The aquaculture system of claim 1, wherein said feed source comprises a container for feed slurry.

5. The aquaculture system of claim 1, further comprising a thermal cover comprising one or more floating surface panels.

6. The aquaculture system of claim 5, wherein at least one of said surface panels is constructed to form an air bubble between the panels and the surface of the pond.

7. The aquaculture system of claim 5, wherein at least one of said surface panels comprises one or more drains operable to drain water from the top of said panel to beneath the surface of the pond.

8. The aquaculture system of claim 5, wherein said thermal cover covers essentially the entire surface of the pond and wherein said one or more floating surface panels are contiguously placed.

9. The aquaculture system of claim 1, wherein said underwater distribution system comprises a plurality of conduits proximate the bottom of the pond arranged to deliver said slurry of feed and aerated water into the pond from beneath the surface of said pond, in a pattern which spans the pond.

10. An aquaculture system comprising a nursery pond, an underwater distribution system arranged to deliver a slurry of fluid, feed and aeration fluid into the pond, and a liquid source in communication with said underwater distribution system.

11. The aquaculture system of claim 10, which further comprises one or more thermally insulating floating surface panels covering at least a portion of the surface of the pond.

12. The aquaculture system of claim 10 wherein said underwater distribution system comprises a plurality of conduits positioned proximate the bottom of the pond and arranged to discharge fluid into the pond in a pattern spanning the pond.

13. A method of culturing shrimp in a pond comprising providing a slurry of feed, water, and aeration from beneath the surface of the pond through a submerged conduit system.

14. The method of claim 13, wherein the slurry of feed, water, and aeration are introduced into the pond at a depth of one foot or less from the bottom of the pond.

15. The method of claim 13, which further comprises providing one or more floating panels on the surface of the pond capable of providing a thermal and evaporative barrier.

16. Apparatus for growing shrimp which comprises:
    a pond having a bottom and sides;
    an underwater distribution system comprising a system of conduits positioned proximate the bottom of the pond and across the bottom of the pond, to convey a slurry of water and particulate feed throughout the pond; and
    a source of water adapted to supply water to the underwater distribution system.

17. The apparatus of claim 16 which further comprises a pump system for injecting the slurry of water and particulate feed into the system of conduits.

18. The apparatus of claim 16 which further comprises an apparatus for injecting an oxygen containing gas into the system of conduits.

19. The apparatus of claim 16 which further comprises a thermal blanket adapted to cover the surface of the pond.

20. Apparatus for growing shrimp which comprises:
    a pond having bottom and sidewalls;
    a system of conduits on the bottom of the pond, said system including a water inlet and a plurality of water outlets positioned to distribute water from the conduits throughout the bottom of the pond;
    apparatus for dispensing an aqueous slurry of shrimp food through the system of conduits;
    apparatus for dispensing an oxygen containing gas through the system of conduits; and
    a thermal cover covering the surface of water within the pond.

21. The apparatus of claim 21, wherein the thermal cover comprises a plurality of cover elements configured to fit side-by-side above the surface of water within the pond and to span the surface of such water so as to insulate the water from the atmosphere.

22. The apparatus of claim 21, wherein each cover element comprises a buoyant frame and a flexible, water impermeable sheet sealed along its periphery to said frame.

23. An aquaculture system for bottom feeding sea life comprising, a pond and an underwater distribution system which comprises an underwater piping system positioned proximate the bottom of the pond and patterned to distribute water throughout the pond below the surface of the pond, a water source in communication with said underwater distribution system, and a cover on the surface of said pond.

24. A system as defined in claim 23 which further comprises at least one riser connected at its lower end to said piping system and adapted at its upper end to discharge water below the surface of the pond.

25. The system as defined in claim 24 wherein said cover comprises a thermal and evaporative barrier covering the surface of the pond.

26. The system of claim 23 wherein said distributed water includes feed.

27. The system of claim 23 which further comprises means to inject an oxygen containing gas into said underwater distribution system.

28. An aquaculture system for bottom feeding sea life which comprises:
    a pond having a bottom and sides;
    an underwater distribution system comprising a system of conduits positioned proximate the bottom of the pond and arranged in a pattern spanning across the bottom of the pond;
    a plurality of nozzles in communication with said conduits to distribute fluids from within the conduits throughout the pond;
    a plurality of rectangular frames capable of floating side-by-side on the surface of water in the pond and sufficient in number to cover the surface in rows and columns; and
    a transparent or translucent water impermeable plastic cover attached to each frame to provide a thermal and evaporative barrier for water in the pond.

29. An aquaculture system as defined in claim 28, wherein the pond is from about three to about five feet deep.

30. An aquaculture system as defined in claim 29, wherein the nozzles are positioned about one foot or less above the bottom of the pond.

31. An aquaculture system as defined in claim 28, wherein one or more of said nozzles are positioned under the approximate center of one or more of said frames.

32. An aquaculture system as defined in claim 28, and further comprising one or more drains adapted to drain water from above said plastic cover to a point below the surface of water in said pond.

33. An aquaculture system as defined in claim 28, which further comprises a pump system in communication with said underwater distribution system operable to deliver a mixture of water and oxygen-containing gas into said underwater distribution system.

34. An aquaculture system as defined in claim 28, which further comprises a source of feed in communication with said pump system to deliver feed into said underwater distribution system.

35. An aquaculture system comprising a pond, an underwater distribution system adapted to deliver feed and aeration into the pond from beneath the surface of said pond, a feed source in communication with said underwater distribution system, a thermal cover comprising one or more floating surface panels, and one or more restraining members installed above the cover to keep the cover in place.

36. Apparatus for growing shrimp which comprises:
    a pond having a bottom and sides;
    an underwater distribution system comprising a system of conduits positioned proximate the bottom of the pond and across the bottom of the pond, to convey water throughout the pond;
    a source of water adapted to supply water to the underwater distribution system; and
    a plurality of riser conduits connected at their lower ends to said system of conduits and terminating at their upper ends to discharge water into the pond beneath the surface of water in the pond.

37. An aquaculture system for bottom feeding sea life comprising, a pond and an underwater distribution system which comprises an underwater piping system positioned proximate the bottom of the pond and patterned to distribute water throughout the pond below the surface of the pond, a water source in communication with said underwater distribution system, at least one riser connected at its lower end to said piping system and adapted at its upper end to discharge water below the surface of the pond, and a thermal and evaporative barrier covering the surface of the pond, and wherein said barrier comprises a plurality of floatable frames arranged side-by-side, and a transparent or translucent plastic sheet covering each frame and secured along a peripherary of each respective frame to define an air space with the surface of the pond.

38. The system as defined in claim 37 wherein a separate said riser is positioned to discharge below each of said frames.

39. The system as defined in claim 37 which further comprises at least one drain for each frame adapted to drain water from the top surface of said plastic sheet and to drain into said pond.

* * * * *